United States Patent [19]
Higashi et al.

[11] Patent Number: 6,026,115
[45] Date of Patent: Feb. 15, 2000

[54] RAKE RECEIVER

[75] Inventors: Akihiro Higashi, Yokosuka; Koji Ohno; Seizou Onoe, both of Yokohama, all of Japan

[73] Assignee: NTT Mobile Communications Network, Inc., Tokyo, Japan

[21] Appl. No.: 08/912,569

[22] Filed: Aug. 18, 1997

[30] Foreign Application Priority Data

Aug. 23, 1996 [JP] Japan ................................. 8-222641

[51] Int. Cl.[7] ................................................ H04B 15/00
[52] U.S. Cl. ...................... 375/200; 375/208; 375/367; 370/335
[58] Field of Search ................................. 375/200, 367, 375/208; 370/335, 320, 206

[56] References Cited

U.S. PATENT DOCUMENTS

| | | | |
|---|---|---|---|
| 5,490,165 | 2/1996 | Blakeney, II et al. | 375/205 |
| 5,805,648 | 9/1998 | Sutton | 375/367 |
| 5,881,057 | 3/1999 | Komatsu | 370/335 |
| 5,889,815 | 3/1999 | Iwakiri | 375/208 |

FOREIGN PATENT DOCUMENTS

| | | |
|---|---|---|
| 0642243A | 3/1995 | European Pat. Off. . |
| 0668662A | 8/1995 | European Pat. Off. . |
| WO94/2864A | 12/1994 | WIPO . |

*Primary Examiner*—Stephen Chin
*Assistant Examiner*—Shuwang Liu
*Attorney, Agent, or Firm*—Brown Raysman Millstein Felder & Steiner LLP

[57] ABSTRACT

A RAKE receiver which is employed in a direct sequence spread spectrum communication system, and which can effectively receive multipath signals. A path searcher measures the amplitude of each path, selects N paths with larger amplitudes in descending order of magnitude, where N is the number of despreaders, and assigns the despreaders to the selected paths to despread the signals of the paths. This assignment of the despreaders to the paths is carried out such that a path with a large amplitude and a path with a small amplitude are assigned to adjacent despreaders and are input to the same pre-detection combiner. The outputs of the despreaders are combined by the pre-detection combiners, and detected by detectors whose outputs are RAKE combined by a post-detection combiner.

8 Claims, 8 Drawing Sheets

RAKE RECEIVER

BACKGROUND OF THE INVENTION

1. Field of the Invention

The present invention relates to a RAKE receiver which is used in a direct sequence spread spectrum communications system, and which can receive multipath signals effectively. The contents of Application No. 8-222,641, filed Aug. 23, 1996, in Japan is hereby incorporated by reference.

2. Description of the Related Art

A spread spectrum communication scheme is a communication method which multiplies a signal to be transmitted by a spreading code with a bandwidth of several to several ten thousand times the bandwidth of the signal at the transmitting side, and transmits it as a wideband signal, and which generates, at a receiving side, a despreading code in synchronism with the spreading code used for the spreading at the transmitting side, and recovers the narrow-band information by multiplying a received signal by the despreading code.

Recently, CDMA (Code Division Multiple Access) has been attracting attention which applies the spread spectrum communication scheme to multiple access of mobile radio systems. The spread spectrum communication method is characterized in resistance to noise and interference and in concealment of information.

In multipath propagation, it is possible to separate the multipaths at a resolution corresponding to the spreading code length in the process of despreading. Since the multipath signals arrive through different paths, their amplitudes and phases vary independently at the receiving point. In particular, fading occurs in mobile channels because the characteristics of a channels fluctuate with the movement of a mobile station. However, since the multipaths fluctuate independently, path diversity effect can be obtained by appropriately combining the multipath signals.

This scheme is called RAKE reception.

FIG. 1 shows a configuration of a conventional RAKE receiver. In FIG. 1, the reference numeral 10 designates despreaders (1)–(n) each corresponding to one of the multipaths; 12 designates a path searcher for detecting timings of the multipaths, and provides the despreaders 10 with the timings; 16 designates detectors (1)–(n) for carrying out detection of the paths; and 18 designates a combiner for combining the outputs of the detectors.

Generally, the path searcher 12 is composed of sliding correlators capable of successively sliding the timing of the despreading, or matched filters matching the spreading codes, or the like.

The operation of the RAKE receiver shown in FIG. 1 will be described. First, the path searcher 12 measures the multipath state of a channel. Detecting the paths, the path searcher 12 sequentially operates the despreaders 10(1)–10(n) at detected timings of the paths. In other words, the despreaders 10(1)–10(n) each receive different multipaths. Since the multipath signals have undergone phase rotation and amplitude fluctuation, the detectors 16(1)–16(n) compensate the phases and amplitudes.

Each pair of the despreaders 10(1)–10(n) and detectors 16(1)–16(n) is called a RAKE finger. The outputs of the RAKE fingers are combined by the combiner 18. The combiner 18 can achieve more efficient reception than merely receiving a signal passing through a single path because the combined output is obtained which is the sum total of the signals passing through the multiple paths, thereby providing a received signal with reduced distortion due to fading.

Thus, the RAKE system can achieve multipath reception which improves the efficiency of incoming power reception, and which provides path diversity effect.

The RAKE receiver as described above in connection with FIG. 1, however, will result in degradation in reception quality when it combines signals passing through the multipaths buried under noise as illustrated in FIG. 2A.

FIG. 2A illustrates the relationships between the noise level and the despread outputs of the received signals from the multipaths, and the inputs of the despread outputs to the respective detectors.

The RAKE reception often employs coherent detection as its detection method. This is because the coherent detection, when it operates ideally, requires a minimum signal-to-noise ratio (S/N ratio) for achieving a particular average bit error rate.

The coherent detection, however, sharply degrades its characteristics when applied to paths buried under the noise as illustrated in FIG. 2A because of estimation errors of absolute phases.

In addition, efficient received power combining cannot be achieved when the number of multipaths exceeds the number of RAKE fingers as illustrated in FIG. 2B. Increasing the number of the RAKE fingers, however, will result in combining the paths buried under the noise.

FIG. 2B, like FIG. 2A, illustrates the relationship between the noise level and the despread outputs of the received signals associated with the paths, and the despread outputs fed to the respective detectors. Here, the outputs not connected to the detectors represent that they do not have corresponding RAKE fingers.

SUMMARY OF THE INVENTION

It is therefore an object of the present invention to provide a RAKE receiver which can achieve the RAKE combining making effective use of the received power even if there are paths buried under the noise, and which can implement high quality reception with reducing the distortion due to the noise.

In accordance with the present invention, a RAKE receiver comprises:

a plurality of despreaders, each of which corresponds to a path among multipaths of a channel, and despreads a received signal of the path;

a plurality of pre-detection combiners, each of which combines at least two signals delivered from the despreaders;

a plurality of detectors for detecting outputs of the pre-detection combiners or outputs of the despreaders;

a post-detection combiner for combining signals output from the detectors; and a path searcher for identifying the multipaths and for assigning the despreaders to the paths.

Here, the RAKE receiver may further comprise a switch for connecting outputs of the despreaders to desired ones of the pre-detection combiners, and for connecting the outputs of the despreaders to inputs of the detectors, wherein the path searcher controls a connection state of the switch.

The path searcher may dynamically change the connection state of the switch in response to an identification result of the multipaths.

At least one of the pre-detection combiners may combine a path with a signal level larger than a predetermined value with another path with a signal level smaller than the predetermined value.

The pre-detection combiners may combine a plurality of paths whose average signal levels are smaller than a particular threshold value, and the post-detection combiner may combine paths whose average signal levels are greater than the threshold level.

The pre-detection combiners may combine the paths whose signal levels are between a first threshold level and a second threshold level lower than the first threshold level, and the post-detection combiner may combine the paths whose signal levels are above the first threshold level, and wherein the paths whose signal levels are below the second threshold level are cancelled without being combined.

The path searcher may determine combinations of the paths such that a sum of average levels of each input to be RAKE combined becomes substantially equal.

The post-detection combiner may combine N paths selected in descending order of magnitude of an average signal level beginning from a greatest one in the average signal level, where N is a predetermined natural number, and the pre-detection combiners combine remaining paths whose average signal levels are smaller than those of the N paths.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The invention will now be described with reference to the accompanying drawings.

EMBODIMENT 1

Figure 3:
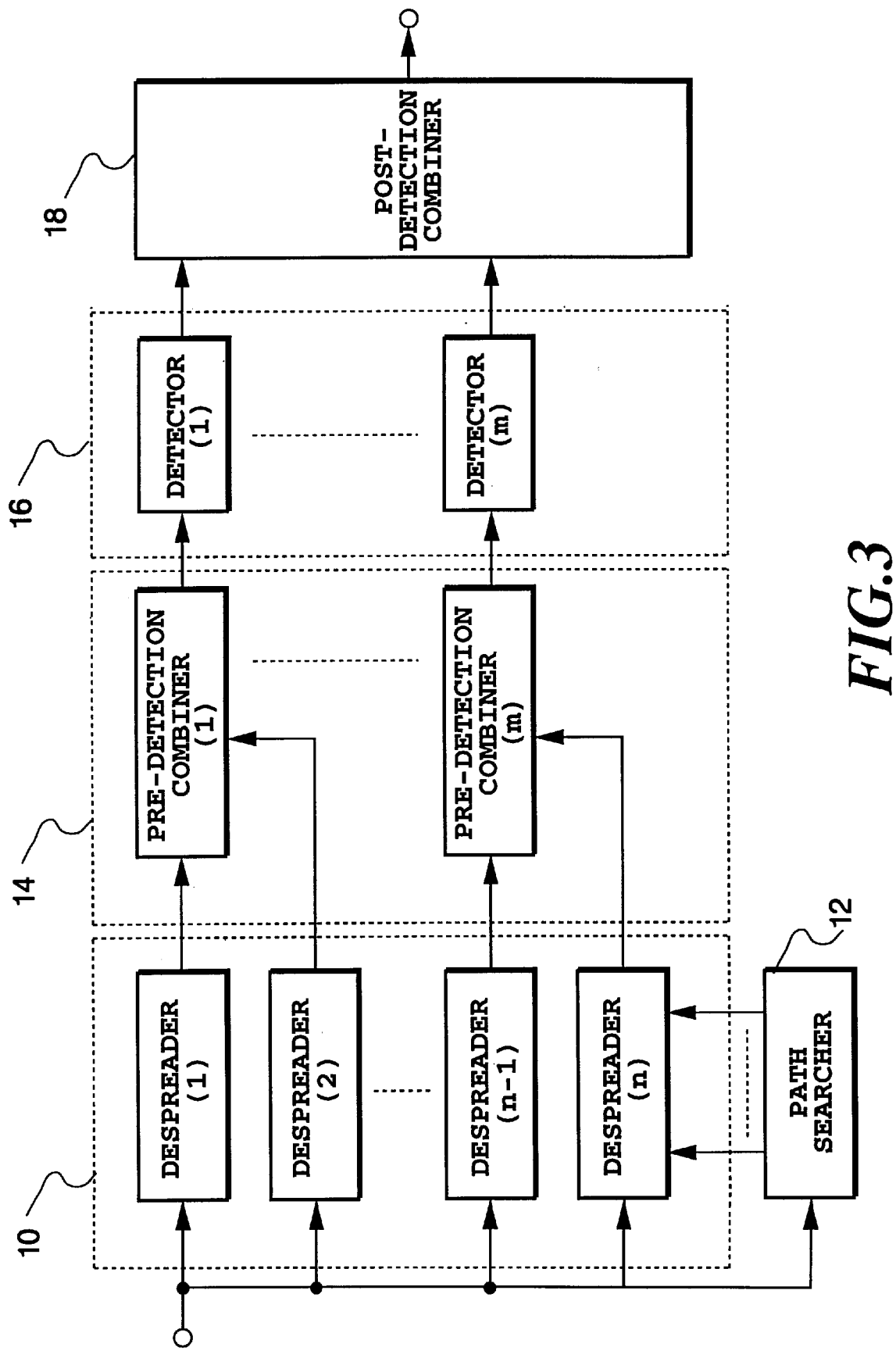
FIG. 3 is a block diagram showing a first embodiment of a RAKE receiver in accordance with the present invention.

FIG. 3 shows a first embodiment of the RAKE receiver in accordance with the present invention.

In FIG. 3, the reference numeral 10 designates n despreaders (1)–(n), 12 designates a path searcher, 14 designates m pre-detection combiners (1)–(m), 16 designates m detectors (1)–(m), and 18 designates a post-detection combiner. Generally speaking, the path searcher 12 is composed of sliding correlators capable of implementing successive sliding of timings of despreading, or of matched filters matched to the spreading codes. In addition, it has a function to measure the amplitudes and delay times of signals of the multipaths. Furthermore, the path searcher 12 can set timings for the despreading to the despreaders 10(1)–10(n) to have them match the paths. The pre-detection combiners 14(1)–14(m) can be each composed of a plain adder. The detectors 16 compensate each path for the phase rotation due to fading or for frequency deviations between the transmitter and the receiver, thereby enabling appropriate RAKE combining to be accomplished. The post-detection combiner 18 is a RAKE combiner that combines the multipath signals with weights to achieve the maximal ratio combining. Part of the despreaders 10(1)–10(n) may be directly connected to some of the detectors 16.

Figure 1:
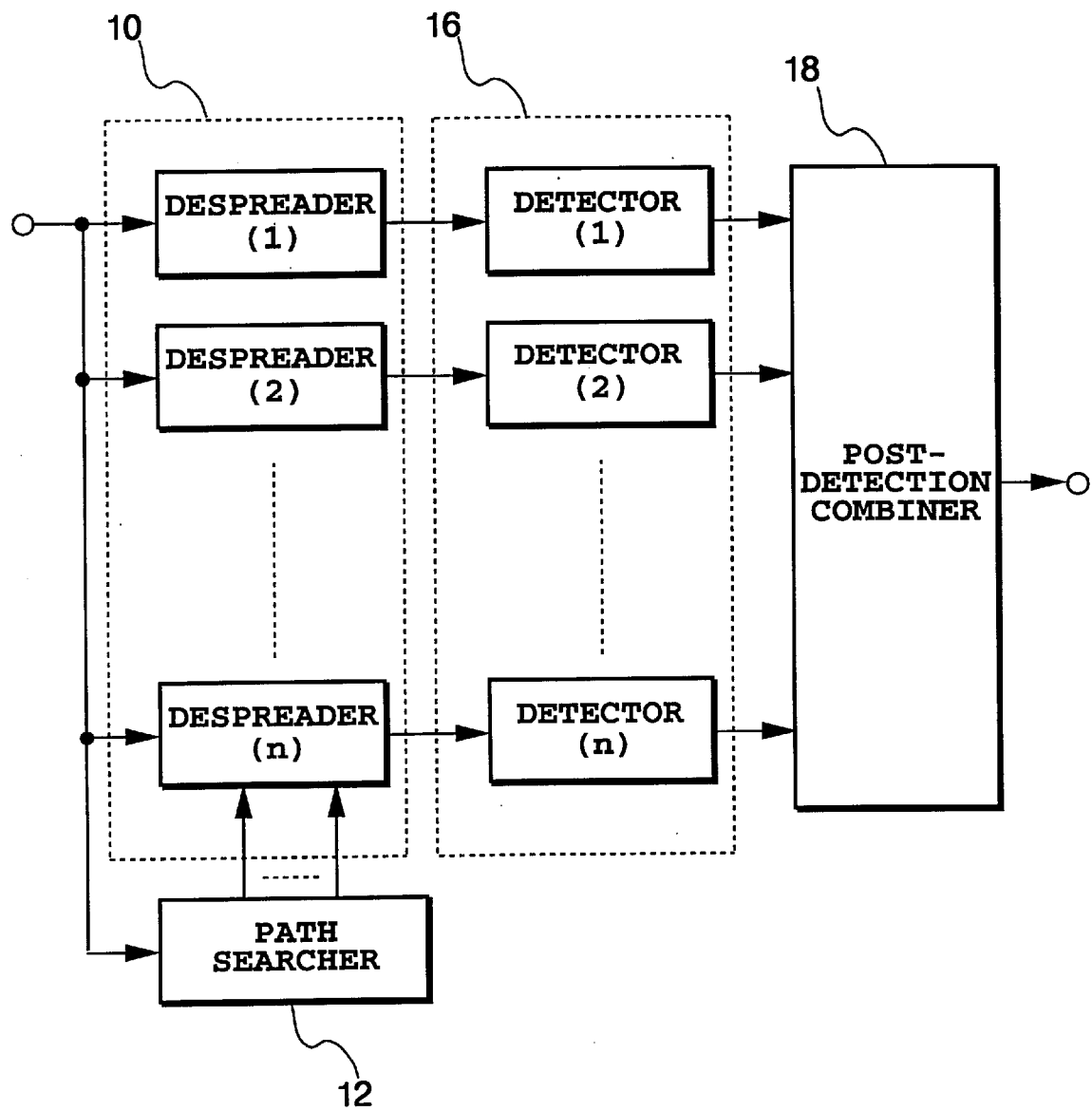
FIG. 1 is a block diagram showing a conventional RAKE receiver.
Figure 2A:
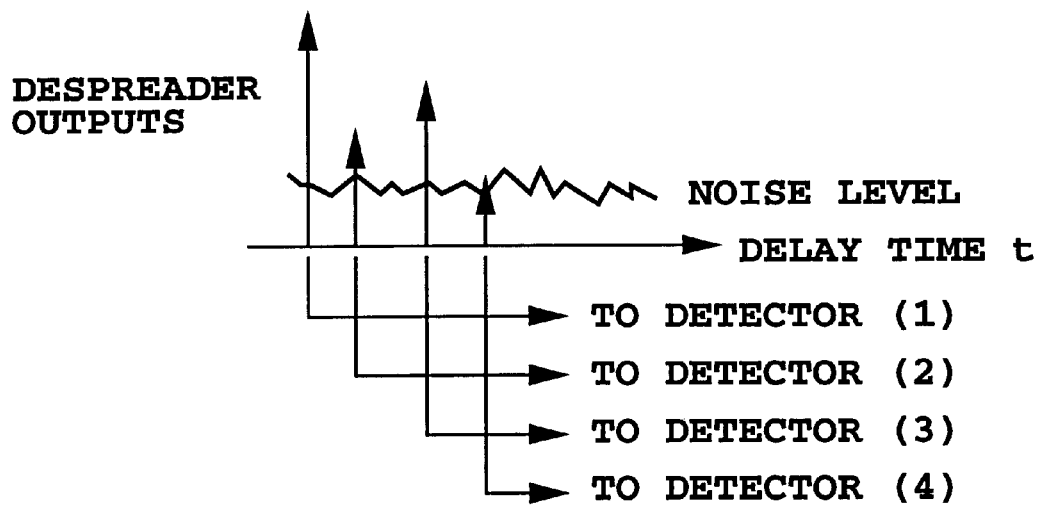
FIGS. 2A and 2B are diagrams illustrating the relationships between the multipaths, noise level and the RAKE fingers.
Figure 2B:
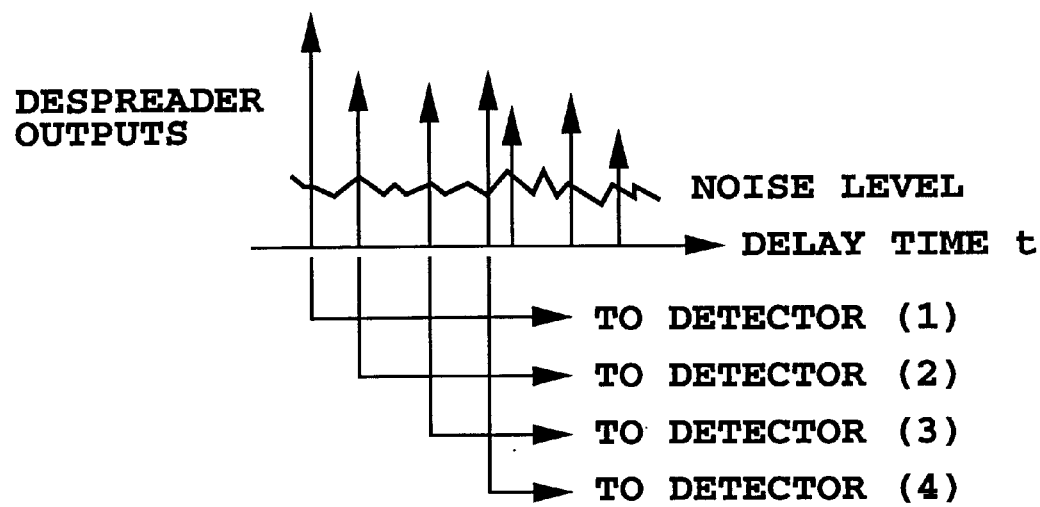

The present RAKE receiver substantially differs from the conventional one as shown in FIG. 1 in that it has the pre-detection combiners 14 interposed between the despreaders 10 and the detectors 16. The pre-detection combiners 14 combine the outputs of the despreaders and supply them to the detectors. In the embodiment as shown in FIG. 3, each pre-detection combiner combines the signals from a pair of paths before detecting the despread signals. Accordingly, the number n of the despreaders and the number m of the detectors are related by the following expression.

$$m=n/2$$

The operation of the RAKE receiver as shown in FIG. 3 will now be described. First, the path searcher 12 measures, for respective paths, the amplitudes and delay times of the signals of the multipaths in response to a received signal. Subsequently, the path searcher 12 selects n paths, where n is the number of the despreaders, in descending order of magnitude of the amplitude beginning from the path with a maximum amplitude, and sets timings to the despreaders 10(1)–10(n), thereby assigning the despreaders 10(1)–10(n) to the paths to despread the multipath signals.

The assignment of the despreaders 10 are carried out in this embodiment in such a fashion that a path with a large amplitude and a path with a small amplitude are assigned to adjacent despreaders, and their outputs are input to the same pre-detection combiner.

Thus, the outputs of the despreaders 10(1)–10(n) are combined by the pre-detection combiners 14(1)–14(n) so that a large amplitude path is paired with a small amplitude path, and detected by he detectors 16(1)–16(m). The detected outputs from the detectors 16(1)–16(m) are combined by the post-detection combiner 18, thereby implementing the RAKE effect.

The pre-combining of the large amplitude path and the small amplitude path enables the power of the multipath to be utilized effectively even when the multipath signals are buried under noise.

Although two paths are each combined in the foregoing embodiment, it is also possible to combine three or more despread outputs. In this case, it may be possible to combine one large amplitude path and two or more small amplitude paths.

The number of the despreaders and the number of paths to be subjected to the pre-detector combining can be determined in advance by measuring the multipath state of the propagation path to be in use, and the number of despreaders available for the equipment.

EMBODIMENT 2

Figure 4:
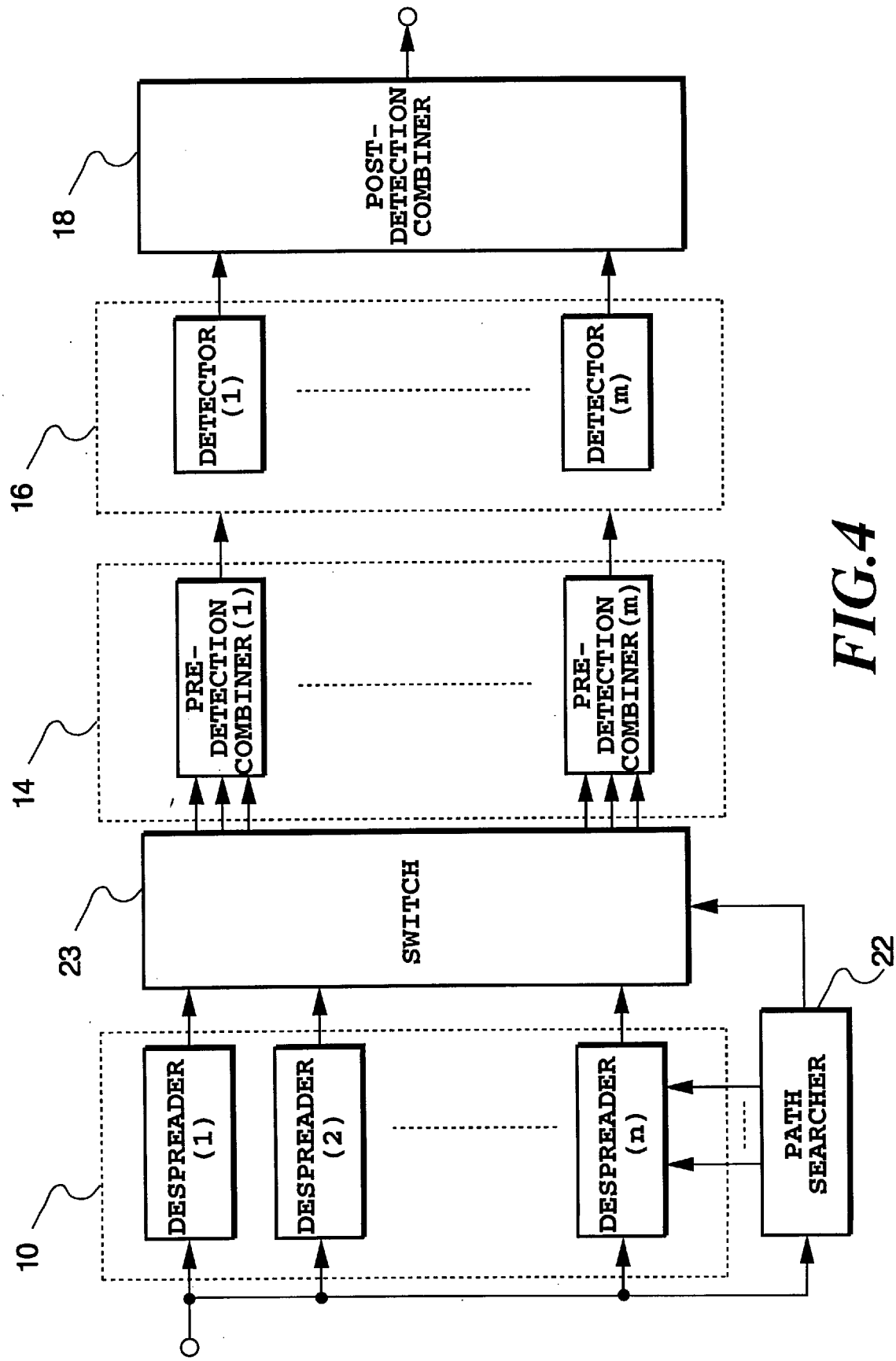
FIG. 4 is a block diagram showing a second embodiment of the RAKE receiver in accordance with the present invention.

FIG. 4 shows a second embodiment of the RAKE receiver in accordance with the present invention.

In FIG. 4, the reference numeral 10 designates despreaders (1)–(n) corresponding to respective paths, 22 designates a path searcher, 23 designates a switch, 14 designates a pre-detection combiners (1)–(m), 16 designates detectors (1)–(m), and 18 designates a post-detection combiner. This RAKE receiver differs from that as shown in FIG. 3 in that it has the switch 23 interposed between the despreaders 10 and the pre-detection combiners 14. The switch 23, under the control of the path searcher 22, can combine the outputs of the despreaders 10(1)–10(n) in desired combinations, and supply them to any pre-detection combiners 14(1)–14(m). Furthermore, the desired outputs of the despreaders 10(1)–10(n) can be directly connected to the inputs of any detectors 16(1)–16(m) without interposing the pre-detection combiners.

The operation of the RAKE receiver as shown in FIG. 4 will now be described. The path searcher 22 detects and measures the multipaths, determines the number of the despreaders 10 to be used and the combinations of the pre-detection combiners in accordance with the number and amplitudes of the multipaths, and sets the switch 23 and the timings of the despreaders 10.

One example will be described of determining the number of the despreaders 10 and the combinations of the pre-detection combiners, which is carried out by the path searcher 12.

(1) It compares each path with the path with the maximum amplitude in the multipaths, and obtains the number N of paths whose amplitudes exceed a threshold level (−6 dB, for example).

(2) It selects 2N despreaders 10, and assigns the despreaders 10 to the paths by setting timings to the despreaders 10.

(3) It forms N combinations by combining each one of the outputs of the N paths whose amplitudes exceed −6 dB with one of the outputs of the N paths whose amplitudes are below −6 dB, which outputs are fed from the despreaders 10, and sets the switch 23 so that the N combinations are input to the pre-detection combiners 14.

Thus, each of the pre-detection combiners 14, receiving a pair of signals of the paths with a large amplitude and a small amplitude, combines them. Subsequently, the outputs of the pre-detection combiners 14 are detected by the detectors 16, and undergo N-path RAKE combining by the post-detection combiner 18.

With this configuration, the switch 23 can dynamically change the combinations of the outputs of the despreaders 10(1)–10(n) and inputs them to any of the pre-detection combiners 14(1)–14(m). This makes it possible, in spite of temporal fluctuations of the multipaths of the propagation paths, to achieve the optimum RAKE combining capable of preventing the combinations that would reduce the combined power or the combinations of the paths including much noise.

There are several combination methods of the paths: For example, (1) A method of combining a path of a large average signal level with a path of a small average signal level (which is describe above).

(2) A method of combining the paths whose average signal levels are smaller than a predetermined threshold level before the detection, but combining the paths whose average signal levels are larger than the predetermined threshold level after the detection.

(3) A method of setting two threshold levels for the average signal level, in which the paths whose amplitudes are less than a smaller second threshold level are cancelled without being combined because they cannot be distinguished from noise, the paths whose amplitudes are between the first and second threshold levels are combined before the detection, and the paths whose amplitudes exceed the greater first threshold level are combined with other paths after the detection.

(4) A method of combining the paths such that the average levels of respective inputs to the RAKE combiner become equal in order to obtain maximum effect with the RAKE combining.

(5) A method of combining N paths after the detection, which are selected in descending order of magnitude of the average levels beginning from the greatest one, but combining the remaining paths before the detection.

Figure 5A:
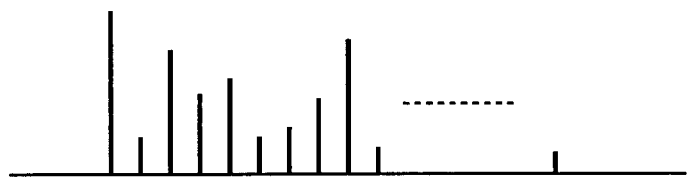
FIGS. 5A and 5B are diagrams illustrating path selection and combining.
Figure 5B:
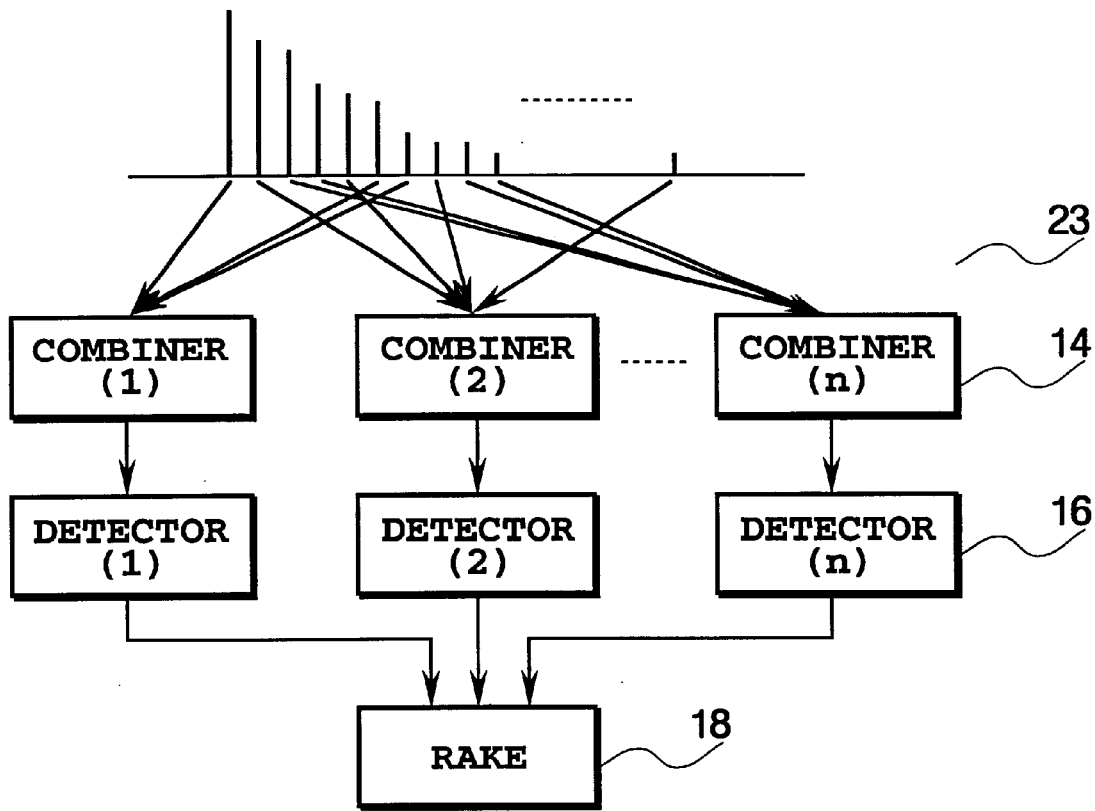

The combining method of the item (4) above will be described in more detail with reference to FIGS. 5A and 5B. As described above, the RAKE combining can achieve the maximum effect when the average levels of the respective inputs to the RAKE combiner are equal. This is similar to the space diversity implemented using a plurality of antennas, in which the diversity effect will reduce if the gains of the antennas and the average received levels differ from one another (unequal gain).

Although there are several combining methods for matching the inputs to the RAKE combining, one of them will be described referring to FIGS. 5A and 5B. First, the average levels of the paths are obtained. This is illustrated in FIG. 5A, in which the x-axis represents the paths and the y-axis represents the average levels. The average levels obtained are sorted in descending order of magnitude. This is shown in FIG. 5B. The paths thus sorted out in terms of the average levels are assigned to the pre-detection combiners 14 beginning from the combiner 14(1) in descending order of magnitude using the switch 23. When the n-th path has been assigned to the combiner 14(n), the remaining paths beginning from the (n+1)-th path in magnitude of the average level are assigned in turn to the combiners 14 in descending order of magnitude beginning from the combiner 14(n) and ending at the combiner 14(1). This process is repeated until the entire paths have been assigned to the combiners 14 as illustrated by arrows in FIG. 5B. The combiners 14, combining the assigned paths, produce the outputs approximately equal in levels. These outputs are detected by the detectors 16, and then input to the RAKE combiner (post-detection combiner) 18. The system thus arranged can provide the RAKE combiner 18 with approximately equal inputs, achieving the most effective RAKE combining.

Figure 6A:
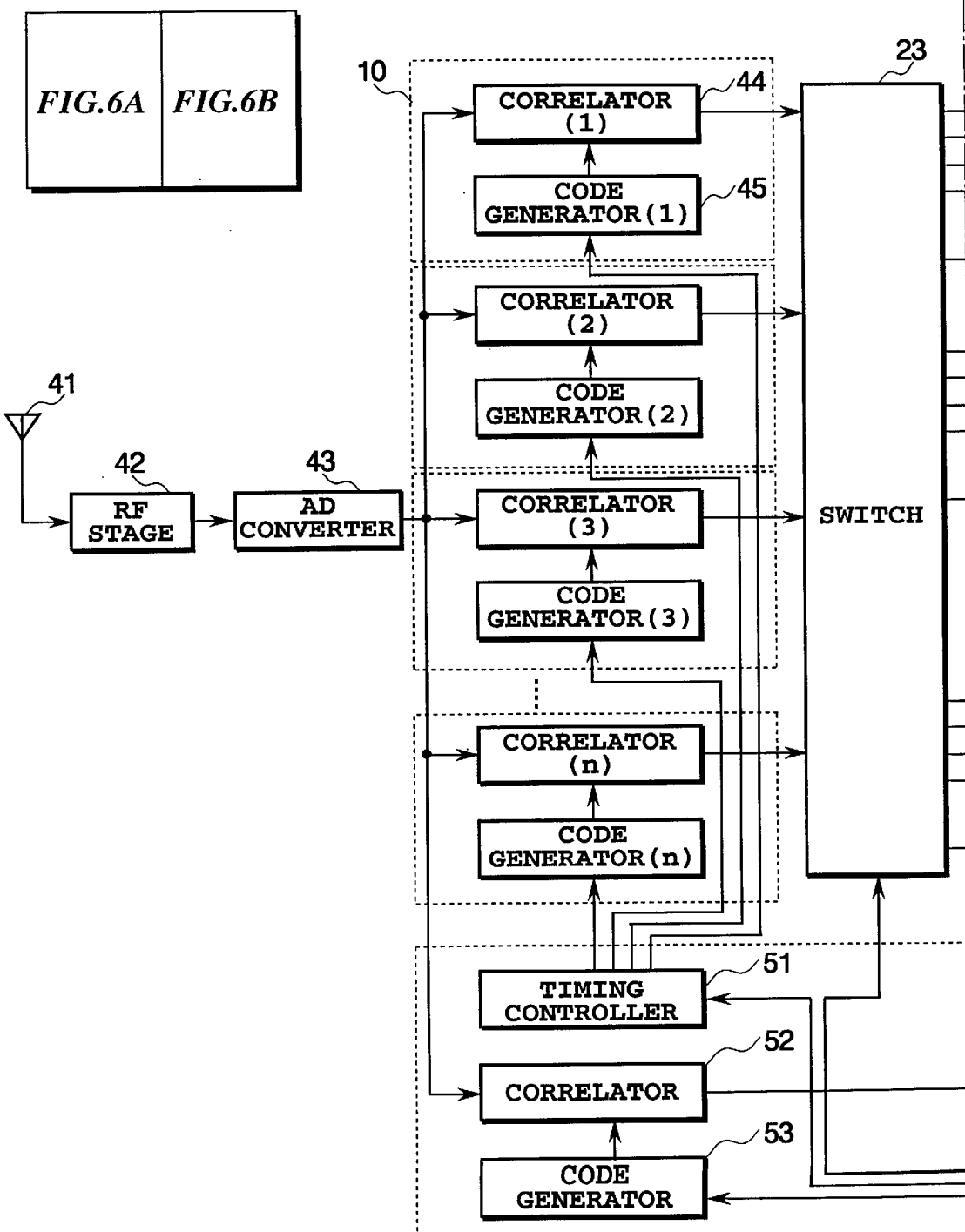
FIGS. 6A and 6B are block diagrams showing details of the RAKE receiver in accordance with the present invention.
Figure 6B:
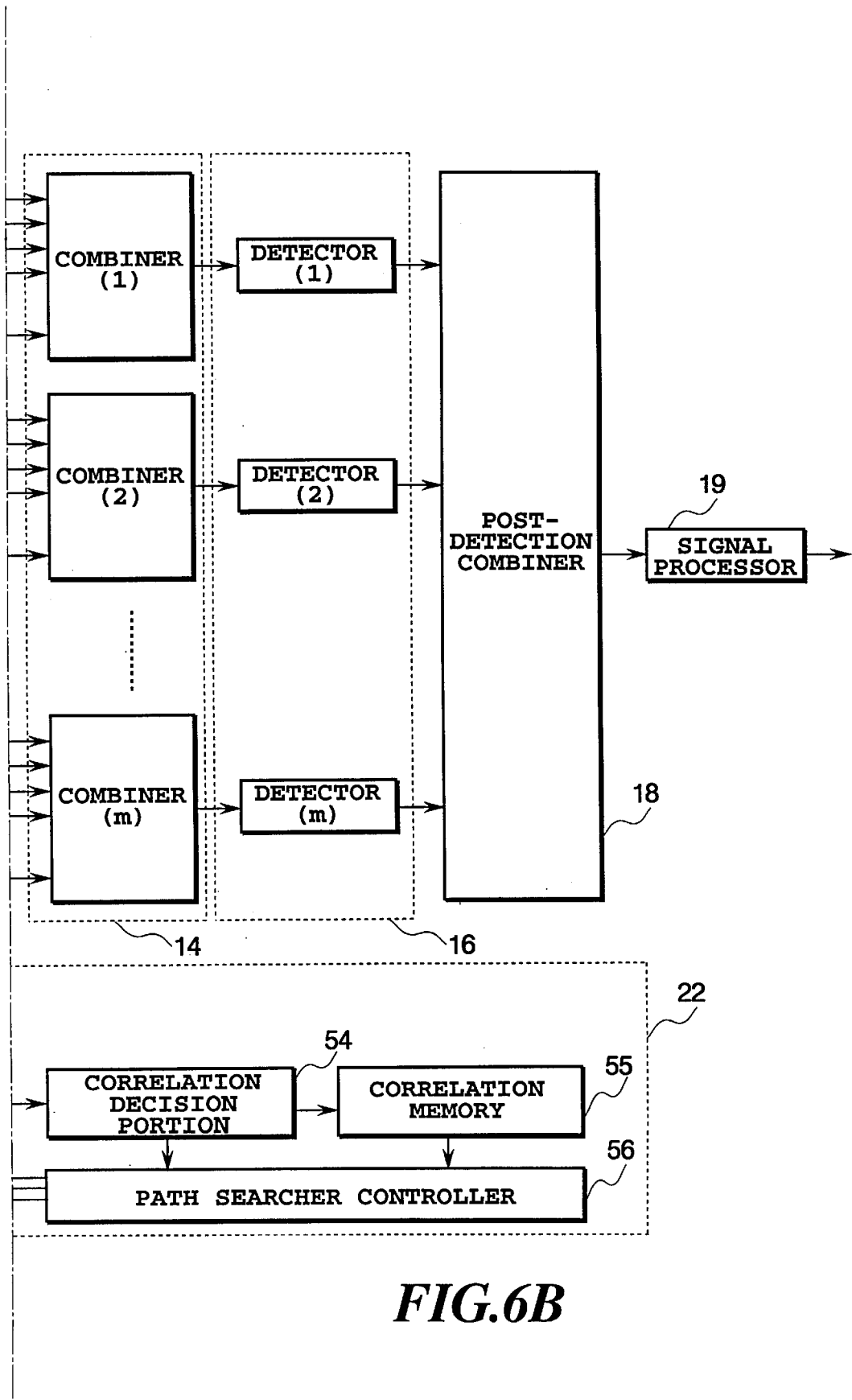

FIG. 6 is a block diagram showing a receiver in which the RAKE combining system as shown in FIG. 4 is incorporated. In FIG. 6, the received signal fed from an antenna 41 is converted to a baseband signal by an RF stage 42, and to a digital signal by an A/D converter 43. The digital signal is supplied to the despreaders 10 as well as to the path searcher 22. The signal input to the path searcher 22 is correlated by a correlator 52 with a code sequence generated by a code generator 53 with its timing sliding, and a correlation decision portion 54 makes a decision whether the correlation has been established. The establishment of the correlation means that a path has been identified. Thus, the timings of the paths identified are sequentially assigned to code generators 45(1)–45(n) in the despreaders 10. Despreading at these timings using the code generators 45 and correlators 44 enables the paths to be assigned to the path fingers.

To obtain the average level of each path, the correlation values of the path are accumulated in a correlation memory 55 including an area for each path. Thus, the average level is obtained for each path, which enables the combining using the average levels described above. After that, the original transmitted signal is recovered by decoding the combined signal by a signal processor 19.

Figure 7:
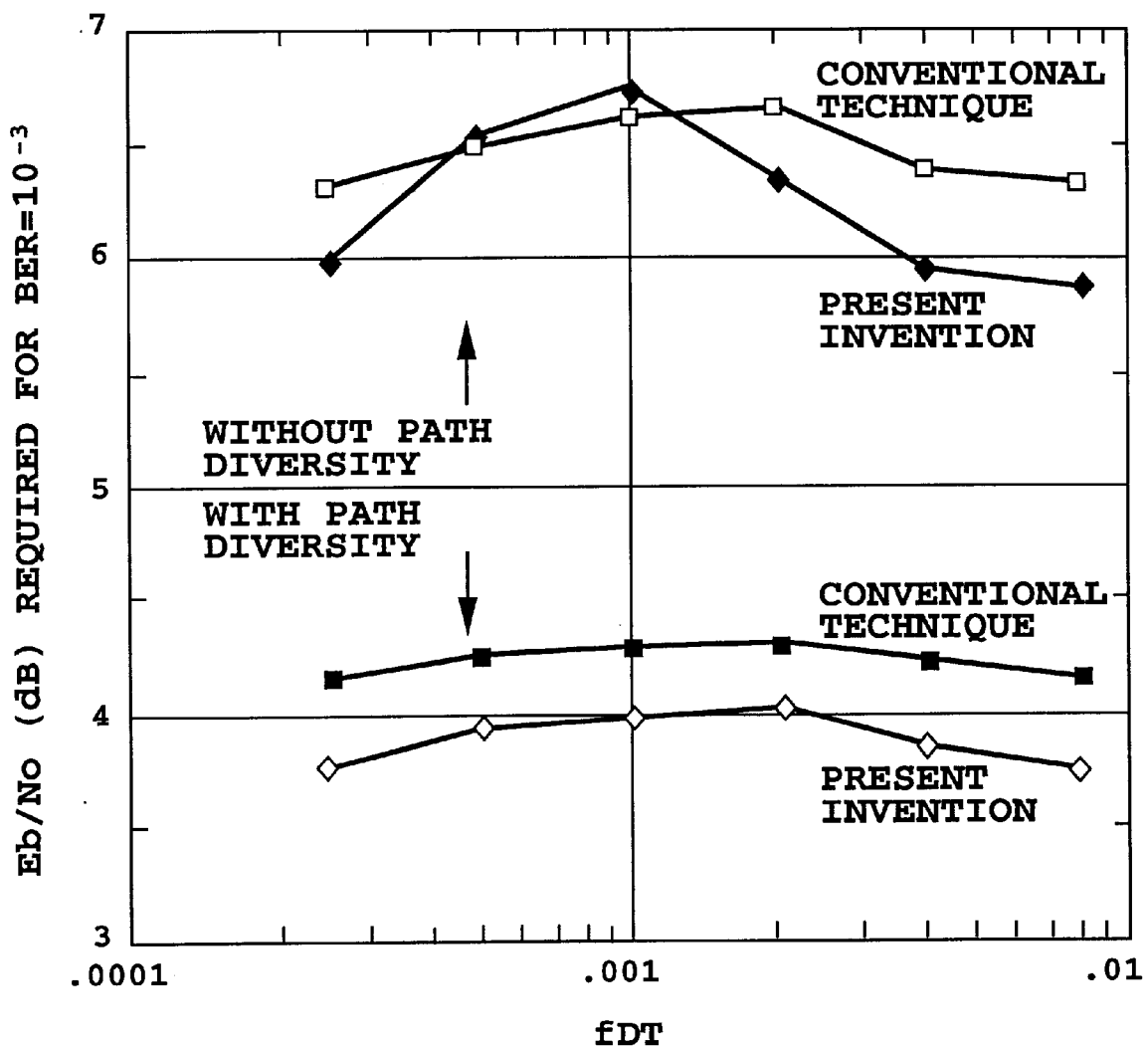
FIG. 7 is a graph illustrating the energy per bit to the noise spectral density (Eb/No) required for achieving an average bit error rate (BER) of $10^{-3}$ against the normalized fading frequency (fDT).

FIG. 7 shows, against the normalized frequency (fDT), characteristics of the energy per bit to the noise spectral density (Eb/No) needed for achieving the average bit error rate (BER) of $10^{-3}$. It is assumed here that there are four multipaths, and they are directly RAKE combined in the conventional system, and that two pairs of paths, each including a path with a large amplitude and a path with a small amplitude, are RAKE combined in the system in accordance with the present invention.

As can be seen from this graph, applying the present invention can achieve the improvement of about 0–0.5 dB in the energy per bit to the noise spectral density without the space diversity, and of about 0.3–0.5 dB with the space diversity.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A RAKE receiver comprising:
   a plurality of despreaders, each of which corresponds to a path among multipaths of a channel, and despreads a received signal of the path;
   a plurality of pre-detection combiners, each of which combines at least two signals delivered from said despreaders;
   a plurality of detectors for detecting outputs of said pre-detection combiners or outputs of said despreaders;
   a post-detection combiner for combining signals output from said detectors; and
   a path searcher for identifying said multipaths and for assigning said despreaders to the paths.

2. The RAKE receiver as claimed in claim 1, further comprising a switch for connecting outputs of said despreaders to desired ones of said pre-detection combiners, and for connecting the outputs of said despreaders to inputs of said detectors, wherein said path searcher controls a connection state of said switch.

3. The RAKE receiver as claimed in claim 2, wherein said path searcher dynamically changes said connection state of said switch in response to an identification result of said multipaths.

4. The RAKE receiver as claimed in claim 1, wherein at least one of said pre-detection combiners combines a path with a signal level larger than a predetermined value with another path with a signal level smaller than the predetermined value.

5. The RAKE receiver as claimed in claim 1, wherein said pre-detection combiners combine a plurality of paths whose average signal levels are smaller than a particular threshold value, and said post-detection combiner combines paths whose average signal levels are greater than the threshold level.

6. The RAKE receiver as claimed in claim 1, wherein said pre-detection combiners combine the paths whose signal levels are between a first threshold level and a second threshold level lower than the first threshold level, and said post-detection combiner combines the paths whose signal levels are above the first threshold level, and wherein the paths whose signal levels are below the second threshold level are cancelled without being combined.

7. The RAKE receiver as claimed in claim 1, wherein said path searcher determines combinations of said paths such that a sum of average levels of each input to be RAKE combined becomes substantially equal.

8. The RAKE receiver as claimed in claim 1, wherein said post-detection combiner combines N paths selected in descending order of magnitude of an average signal level beginning from a greatest one in the average signal level, where N is a predetermined natural number, and said pre-detection combiners combine remaining paths whose average signal levels are smaller than those of the N paths.

* * * * *